United States Patent
Saito et al.

(10) Patent No.: US 6,221,454 B1
(45) Date of Patent: Apr. 24, 2001

(54) BONDED OPTICAL DISKS AND A METHOD AND AN APPARATUS FOR PRODUCING THE SAME

(75) Inventors: Kazuta Saito, Tokyo; Katsuya Takamori; Yorinobu Takamatsu, both of Sagamihara, all of (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/193,479

(22) Filed: Nov. 17, 1998

(51) Int. Cl.[7] ...................................................... B32B 3/02
(52) U.S. Cl. ...................... 428/64.1; 428/64.4; 428/65.2; 428/913; 430/270.11; 430/495.1; 430/945; 369/283; 369/288
(58) Field of Search ................................. 428/64.1, 64.2, 428/64.4, 65.2, 913; 430/270.11, 495.1, 945; 369/283, 288

(56) References Cited

U.S. PATENT DOCUMENTS

| | | | |
|---|---|---|---|
| 5,128,388 | 7/1992 | Komori et al. | 522/95 |
| 5,146,438 | 9/1992 | Harper | 369/13 |
| 5,227,213 | 7/1993 | Komori et al. | 428/64 |
| 5,284,538 | 2/1994 | Suzuki et al. | 156/154 |
| 5,318,653 | 6/1994 | Toide et al. | 156/295 |

(List continued on next page.)

FOREIGN PATENT DOCUMENTS

| | | |
|---|---|---|
| 197 15 779 | 10/1998 | (DE). |
| 0 390 413 | 10/1990 | (EP). |
| 0 814 470 A2 | 12/1997 | (EP). |
| 0 866 450 A1 | 9/1998 | (EP). |
| 61-292244 | 12/1986 | (JP). |
| 63-49424 | 3/1988 | (JP). |
| 1-266447 | 10/1989 | (JP). |
| 8-161771 | 6/1996 | (JP). |
| 8-306077 | 11/1996 | (JP). |
| WO 97/36738 | 10/1997 | (WO). |
| WO 98/08220 | 2/1998 | (WO). |

OTHER PUBLICATIONS

Patent Abstracts of Japan, vol. 016, No. 418, JP 04139630, May 13, 1992.
Patent Abstracts of Japan, vol. 012, No. 002, JP 621654240, Jul. 20, 1987.
Partial International Search Report mailed Apr. 12, 1999.
Patent Abstracts of Japan vol. 097, No. 005, JP 09 017039, Jan. 17, 1997.
Patent Abstracts of Japan, vol. 097, No. 002, JP 08 273213, Oct. 18, 1996.

(List continued on next page.)

Primary Examiner—Elizabeth Evans
(74) Attorney, Agent, or Firm—Doreen S. Gwin; Scott A. Bardell

(57) ABSTRACT

A bonded optical disk comprising first and second transparent substrates bonded with a light-permeable, pressure sensitive adhesive layer and at least one information recording layer wherein the pressure sensitive adhesive layer has been formed from a pressure sensitive adhesive precursor, having a viscosity of 10 to 5000 cps and being applied onto at least one of the first substrate and the second substrate by radiation curing and has a gel fraction of not less than 50% and a storage modulus of $1.0 \times 10^4$ to $1.0 \times 10^7$ $dyn/cm^2$ at 25° C., or in place of the pressure sensitive adhesive layer, an adhesive layer derived from a radiation curable adhesive precursor having a viscosity of 500 to 10000 cps, and the adhesive precursor is subjected to a higher pressure than an atmospheric pressure, prior to being irradiated, as well as a method and an apparatus for producing a bonded optical disk.

7 Claims, 7 Drawing Sheets

U.S. PATENT DOCUMENTS

| | | | |
|---|---|---|---|
| 5,366,573 | 11/1994 | Bayer et al. | 156/64 |
| 5,399,220 | 3/1995 | Winslow | 156/273.3 |
| 5,401,610 * | 3/1995 | Miwa | 430/271 |
| 5,540,967 * | 7/1996 | Toide | 428/64.4 |
| 5,582,677 | 12/1996 | Miwa et al. | 156/382 |
| 5,824,385 * | 10/1998 | Itoigawa | 428/64.1 |
| 5,906,907 * | 5/1999 | Miwa | 430/270.11 |

OTHER PUBLICATIONS

Patent Abstracts of Japan, vol. 098, No. 002, JP 09 262907, Oct. 7, 1997.

PCT International Search Report mailed Jul. 9, 1999.

"3M Optical Disc Adhesive SP-5", 3M Brochure, Jun., 1997.

* cited by examiner

BONDED OPTICAL DISKS AND A METHOD AND AN APPARATUS FOR PRODUCING THE SAME

FIELD OF THE INVENTION

The present invention relates to an optical disk and more particularly to a bonded optical disk having a structure comprising two substrates bonded to each other. The present invention also relates to a method and an apparatus for producing such a bonded optical disk.

BACKGROUND OF THE INVENTION

The advance of multimedia in recent years has enabled even image and sound data to be processed with digital signals. In general, images and sounds have a large amount of information, and, therefore, a high capacity/high density recording medium is required to cope with this. Optical disks, which can also cope with a demand for a further increase in capacity and a further increase in density in the future, such as DVD (digital versatile disk) and CD (compact disk), have attracted attention as the above recording medium.

The optical disk, in many cases, comprises two transparent substrates bonded to each other through an information recording layer. Methods for bonding the two substrates are disclosed, for example, in Japanese Unexamined Patent Publication (Kokai) Nos. 1-266447, 61-292244, and 63-49424 and "Denshi Zairyo (Electronic Materials)," Vol. 35, No. 6, 46–49, 1996), "Pressure Sensitive Adhesive Double Coated Tape used in Bonding of DVD" In particular, in the method described in the journal "Denshi Zairyo," a pressure sensitive adhesive double coated tape is applied to one of or both the two substrates, and the two substrates are then intimately contacted with each other, followed by press bonding to prepare an optical disk.

As is reported by "Denshi Zairyo", for the above method using a pressure sensitive adhesive double coated tape, various improvements are necessary from the viewpoint of workability. Specifically, in this method, separation of a release liner and cutting of the pressure sensitive adhesive double coated sheet into a desired shape are necessary in addition to the application of the pressure sensitive adhesive double coated tape, complicating the process, which tends to increase the production cost. Further, this method has a further drawback that, in the application of the pressure sensitive adhesive double coated sheet, the presence of a residual stress creates warpage of the substrate.

On the other hand, typically, Japanese Unexamined Patent Publication (Kokai) No. 8-161771 discloses a method not using a pressure sensitive adhesive double coated sheet. Specifically, in this method, instead of using the pressure sensitive adhesive double coated sheet, two UV-permeable substrates are bonded to each other through an ultraviolet (UV) curable adhesive precursor formed by roll coating, and UV is applied to the adhesive precursor through the substrate to form a transparent adhesive layer.

Among various conventional optical disks, recently commercialized one are dual layer type optical disks which are also referred to as "DVD-9". In this type of optical disk, two information recording layers, one of which is of a reflection type and the other a semitransparent type, are provided on substrates through a transparent adhesive layer, permitting recording of information on the information recording layer and reading of the information recorded on the information recording layer to be performed from one side of the disk. When this dual layer type optical disk is produced by the method described in Japanese Unexamined Patent Publication (Kokai) No. 8-161771 noted above, the adhesive layers would be formed by applying UV to the pressure sensitive adhesive precursor through the semitransparent recording layer. Generally, the adhesive layer in such optical disk is used to attain the bonding of the substrates, and therefore the adhesive layer should be constructed, for example, so that a laser beam from an optical head is passed through the semitransparent recording layer and focused on the underlying reflection type recording layer. That is, what is required of the adhesive layer is not only to be homogeneous but also to function also as an optical spacer having a given thickness.

However, as is pointed out in Japanese Unexamined Patent Publication (Kokai) No. 8-306077, the adhesive precursor of the optical disk disclosed in Japanese Unexamined Patent Publication (Kokai) No. 8-161771 has a problem that unevenness of thickness of the adhesive layer is produced in the radial direction of the optical disk. To apply UV to the adhesive precursor through the semitransparent recording layer, an output of UV light source has to be increased to a higher level than would be needed, in view of absorption of UV in the recording layer. Therefore, there is a possibility that the optical disk obtained has deteriorated optical properties and yield.

In addition to the above problems, as is pointed out in Japanese Unexamined Patent Publication (Kokai) No. 9-320129, the adhesive precursor of the above-described type has a problem that bubbles can be incorporated into an adhesive layer due to presence of air in an atmosphere, when an adhesive precursor is UV-cured to form the adhesive layer for bonding the substrates.

Incorporation of bubbles in the adhesive layer may adversely affect the qualities of the resulting optical disks and therefore, as is disclosed in, for example, Japanese Unexamined Patent Publication (Kokai) No. 61-292244, it is conceived to bond the substrates through an adhesive layer in vacuum or under the environmental conditions of reduced pressure. In practice, the bonding of the substrates in accordance with the above method is effective to prevent air from being captured between the substrates, however, it cannot fully solve the above-mentioned problem concerning the incorporation of the bubbles. This is because the incorporation of the bubbles in the adhesive layer can be caused due to the adhesive used itself, in addition to the above-described reason, i.e., atmospheric air. The inventors have found that the adhesive which is generally used as a liquid adhesive contains a substance capable of being evaporated or vaporized in the process of curing of the adhesive, and therefore finely divided bubbles can be formed in the adhesive layer as a result of the evaporation or vaporization of said substance in the vacuum or under the reduced pressure, and also the thus formed bubbles cannot be again dissolved and dissipated in the adhesive layer.

Particularly important problem is caused when such incorporation of bubbles is observed in the single side dual layer type optical disks in which a single side or surface is used for the reproduction purpose. For the dual layer type optical disks, two disk substrates are generally bonded through a transparent adhesive layer, and the adhesive layer is also used to space the substrates for optically separating two recording layers of said substrates, and therefore incorporation of fine and visually uninspectable bubbles in the adhesive layer must be fully prevented, however, such prevention of the bubble incorporation problem causes another problem concerning production technique. Accordingly, it is desired to completely remove the bubble formation problem due to the above-described different reasons from the adhesive layer which is used to bond two disk substrates without, causing another problem.

SUMMARY OF THE INVENTION

An object of the present invention is to overcome the above problems of the prior art and to provide a bonded optical disk which can be effectively and easily produced and at the same time, possesses an excellent quality.

Another object of the present invention is to provide a bonded optical disk having an excellent quality, which can prevent incorporation of fine bubbles in the adhesive layer bonding the substrates, said bubbles being produced due to air in the atmosphere or a substance, capable of being evaporated or vaporized, in the adhesive.

Another object of the present invention is to provide a method for producing the above optical disk of the present invention with a high production efficiency.

Still another object of the present invention is to provide an apparatus for producing the above optical disk of the present invention with a high production efficiency.

According to one aspect of the present invention, there is provided a bonded optical disk comprising:

a first transparent substrate;

a second transparent substrate;

a light-permeable, pressure sensitive adhesive layer for bonding the first substrate to the second substrate; and at least one information recording layer provided between the first substrate and the second substrate and the pressure sensitive adhesive layer, wherein the pressure sensitive adhesive layer has been formed from a pressure sensitive adhesive precursor, having a viscosity of 10 to 5000 cps and being applied onto at least one of the first substrate and the second substrate, by radiation curing and has a gel fraction of not less than 50% and a storage modulus of $1.0 \times 10^4$ to $1.0 \times 10^7$ dyn/cm$^2$ at 25° C.

According to the present invention, there is also provided a method for producing a bonded optical disk comprising: a first transparent substrate; a second transparent substrate; a light-permeable, pressure sensitive adhesive layer for bonding the first substrate to the second substrate; and at least one information recording layer provided between the first substrate and the second substrate and the pressure sensitive adhesive layer, said method comprising the steps of:

applying a pressure sensitive adhesive precursor having a viscosity of 10 to 5000 cps on at least one surface of the first substrate and the second substrate;

applying radiation directly to the pressure sensitive adhesive precursor to form a pressure sensitive adhesive layer which has been brought to a gel fraction of not less than 50% and a storage modulus of $1.0 \times 10^4$ to $1.0 \times 10^7$ dyn/cm$^2$ at 25° C.; and bonding the first substrate to the second substrate through the pressure sensitive adhesive layer under reduced pressure.

Also, according to the present invention, there is provided an apparatus for producing a bonded optical disk comprising: first and second transparent substrates each having an opening in its center portion; a light-permeable adhesive layer for bonding the first substrate to the second substrate; and at least one information recording layer provided between the first substrate and the second substrate and the adhesive layer, said apparatus comprising:

(1) a vacuum chamber for housing therein the first substrate and the second substrate, the vacuum chamber being capable of being evacuated to a predetermined pressure;

(2) a first shaft having an end section, within the vacuum chamber, for supporting one of the first and second substrates in the circumferential portion of the opening; and (3) a second shaft having an end section, within the vacuum chamber, for supporting the other substrate in the circumferential portion of the opening, the front end of the end section in the first shaft and the front end of the end section in the second shaft being disposed within the opening of the first substrate and the opening of the second substrate, at least one of the first and second shafts being movable so that the end section of the first shaft and the end section of the second shaft disposed so as to face each other are allowed to come close to each other to bring the first and second substrates into intimate contact with each other.

According to another aspect of the present invention, there is provided a bonded optical disk comprising:

a first transparent substrate;

a second transparent substrate;

a light-permeable adhesive layer for bonding the first substrate to the second substrate; and at least one information recording layer provided between the first substrate and the second substrate and the adhesive layer, wherein the adhesive layer is formed from a radiation-curable adhesive precursor having a viscosity of 500 to 10000 cps which is irradiated to cause curing of the adhesive precursor, and wherein the first substrate and the second substrate are attached through the adhesive precursor, and wherein the adhesive precursor, prior to being irradiated, is subjected to a pressure higher than an atmospheric pressure between the first substrate and the second substrate.

According to the present invention, there is also provided a method for producing a bonded optical disk comprising: a first transparent substrate; a second transparent substrate; a light-permeable adhesive layer for bonding the first substrate to the second substrate; and at least one information recording layer provided between the first substrate and the second substrate and the adhesive layer, said method comprising the steps of:

applying a radiation-curable adhesive precursor having a viscosity of 500 to 10000 cps on at least one surface of the first substrate and the second substrate;

combining the first substrate and the second substrate, with the adhesive precursor between the first and second substrate, under a reduced pressure;

exposing the adhesive precursor to a pressure higher than an atmospheric pressure, while maintaining the combined state of the first substrate, the second substrate and the adhesive precursor; and irradiating the adhesive precursor with a radiation to cause its curing, thereby bonding the first substrate and the second substrate through the adhesive layer.

Further, according to the present invention, there is provided the above-described apparatus for producing a bonded optical disk comprising: first and second transparent substrates each having an opening in its center portion; a light-permeable adhesive layer for bonding the first substrate to the second substrate; and at least one information recording layer provided between the first substrate and the second substrate and the adhesive layer, in which said adhesive layer is a pressure sensitive adhesive layer.

Furthermore, according to the present invention, there is also provided the production apparatus of a bonded optical disk of the above-described type, in which said vacuum chamber further comprises, having connected therewith, a pressurizing apparatus for exposing the adhesive precursor to a pressure higher than an atmospheric pressure, while maintaining the combined state of the first substrate, the second substrate and the adhesive precursor.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
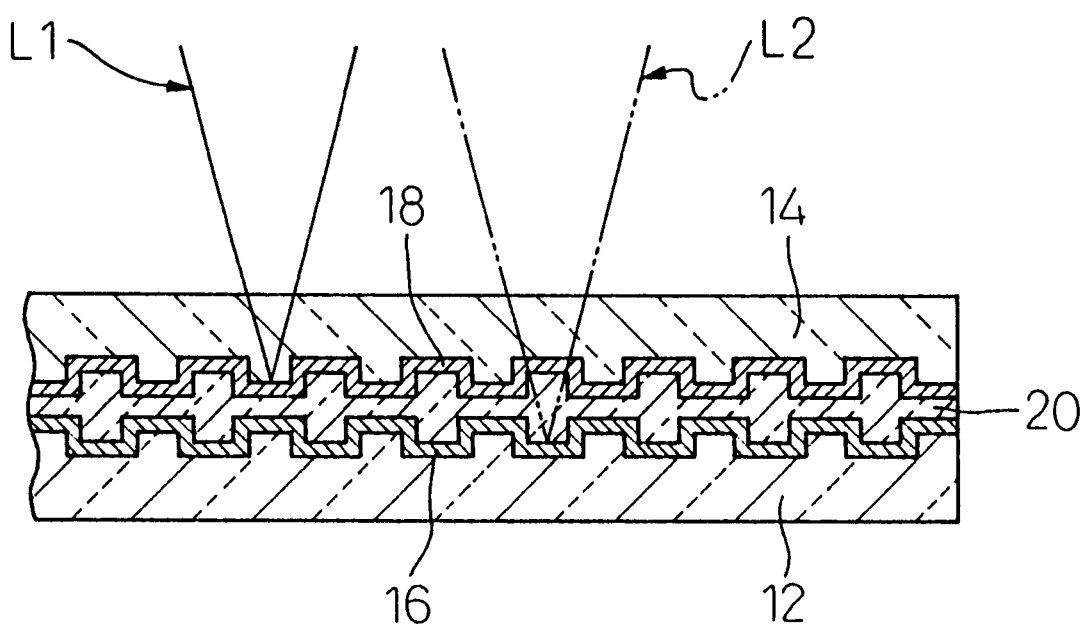
FIG. 1 is a sectional side view of a single side dual layer optical disk which is a preferred embodiment of the bonded optical disk of the present invention.

The present invention will be described with reference to the following preferred embodiments. In the drawings referred to in the following description, like parts are identified with the same reference numerals. Further, it should be understand that in the bonded optical disks of the present invention, for bonding the first transparent substrate with the second transparent substrate, a pressure sensitive adhesive derived from the radiation-curable pressure sensitive adhesive precursor is utilized in one embodiment of the present invention, and an adhesive derived from a radiation-curable adhesive precursor is utilized in another embodiment of the present invention, and both the pressure sensitive adhesive and the adhesive can be interchangeably utilized, insofar as they do not adversely affect the functions and effects of the present invention.

In one embodiment of the present invention, the bonded optical disk according to the present invention has a structure comprising two transparent substrates bonded to each other, that is, a structure comprising a first transparent substrate bonded to a second transparent substrate through a light-permeable, pressure sensitive adhesive layer, and, in addition, for information recording, a recording layer is provided on the surface of at least one of the first and second substrates, that is, on the pressure sensitive adhesive layer side of the substrate. As is well known in the art, there are various types of bonded optical disks having such a structure, examples of which include a single side optical disk having a reflection type recording layer on one substrate alone, a double side optical disk wherein a reflection type recording layer is provided on both the substrates, and a single side dual layer optical disk wherein a reflection type recording layer is provided on one of the substrates with a semitransparent recording layer being provided on the other substrate. Although the present invention can be advantageously applied to any type of the optical disks, it can be especially favorably applied to the single side dual layer optical disk.

In the optical disk, the first and second transparent substrates can be formed from transparent plastic materials, such as acrylic resin and polycarbonate resin, by conventional molding methods as commonly conducted in the art, such as injection molding. In some cases, other transparent materials, for example, glass, may be used instead of the transparent plastic material as the substrate. The size (diameter and thickness) of the substrate may be widely varied depending upon the size of the desired optical disk. For example, in the case of optical disks such as commercially available DVD, the substrate before bonding has a diameter of 12 cm and a thickness of 0.6 cm. In the center portion of the substrate, a small opening (a hole for inserting a shaft therein) is provided so that, when the optical disk is loaded into a disk drive, the optical disk can be supported by a shaft of the drive.

Irregular patterns or irregular pits corresponding to information signals to be recorded on the optical disk, such as images and sounds, are provided on the surface, on which the recording layer is to be formed, among the surfaces of the transparent substrates. The irregular pattern or the like may be provided by using a master stamper or by photolithography.

A thin film of a metallic material, a ceramic material or the like suitable for the formation of a reflection or semitransparent type recording layer is applied onto the formed irregular pattern or the like. Materials suitable for the reflection type recording layer include materials having a reflectance of about 90% after the film formation, for example, aluminum. Materials suitable for the semitransparent recording layer include materials having a reflectance of about 50% after the film formation, for example, gold, silicon-based dielectrics (for example, silicon nitride represented by the formula: $SiN_x$ and SiC). The recording layer may be formed from these materials by conventional film forming methods, for example, sputtering or vacuum deposition.

In the optical disk according to the present invention, the first transparent substrate and the second transparent substrate are bonded to each other using a pressure sensitive adhesive layer. In particular, the present invention is characterized in that the pressure sensitive adhesive layer interposed for bonding the substrates to each other is formed from a pressure sensitive adhesive precursor preferably having a viscosity of 10 to 5000 cps and has a gel fraction of not less than 50% and a storage modulus at 25° C. of $1.0 \times 10^4$ to $1.0 \times 10^7$ $dyn/cm^2$.

When the viscosity of the pressure sensitive adhesive precursor is less than about 10 cps, the pressure sensitive adhesive layer precursor may drip from the circumferential portion of the substrate after coating and before radiation irradiation, rendering the thickness of the pressure sensitive adhesive layer uneven. On the other hand, when the viscosity is more than about 5000 cps, unevenness of coating thickness may occur, leading to a fear of the thickness of the pressure sensitive adhesive layer becoming uneven.

When the pressure sensitive adhesive layer has a gel fraction of less than 50%, the optical disk after bonding of the substrates may not be able withstand severe environment, such as high temperature and high humidity environment, often resulting in separation between the substrates or inclusion of bubbles in the pressure sensitive adhesive layer.

Further, when the pressure sensitive adhesive layer has a storage modulus of less than about $1.0\times10^4$ dyn/cm$^2$, it may be easily deformed by compression at the time of bonding, which may make it difficult to provide even thickness. On the other hand, when the storage modulus is more than about $1.0\times10^7$ dyn/cm$^2$, the tackiness may deteriorate, which may make it impossible to bond the substrates to each other. Note that the adhesive precursor can have a storage modulus different from the pressure sensitive adhesive precursor.

The pressure sensitive adhesive precursor used in the practice of the present invention may be suitably selected from the compounds satisfying the above requirements. However, the pressure sensitive adhesive precursor is preferably formed from ultraviolet (UV) curable or electron beam (EB) curable compounds, from the viewpoints of availability, curing time, curing conditions and the like. Acrylic compounds may be particularly advantageously used as the pressure sensitive adhesive precursor. Coating of the pressure sensitive adhesive precursor onto the substrate can be advantageously carried out by a conventional coating method, such as spin coating, screen printing, or roll coating. Although the coating thickness may vary depending upon the desired bond strength, it is generally in the range of about 20 to 70 μm.

FIG. 1 is a sectional side view showing one embodiment of the bonded optical disk according to the present invention. This optical disk, as described above, is called a single side dual layer type optical disk (hereinafter referred to simply as "optical disk") and permits information to be optically recorded on the two recording layers or information to be read from the recording layers.

An optical disk 10 shown in FIG. 1 comprises two substrates 12 and 14 each made of a transparent resin (for example, polycarbonate resin), and an irregular pattern is provided on the surface of each of the transparent substrates. Further, each of the substrates has in its center portion a circular hollow portion (an opening 11) as shown in FIG. 2. Loading of the optical disk 10 on an optical disk drive may be performed by placing the opening on the shaft and supporting the disk by the shaft. A first information recording layer 16, which is made of a metal, such as aluminum, and functions to record information, is disposed on a first transparent substrate 12. This first information recording layer 16 has a reflectance of about 90%. Likewise, a second information recording layer 18, for recording information, formed of gold or a silicon-based dielectric, such as SiNx or SiC, is provided on a second transparent substrate 14. This second information recording layer 18, unlike the first recording layer 16 having a high reflectance, is semitransparent.

Further, a light-permeable, pressure sensitive adhesive layer 20 is provided between the first information recording layer 16 and the second information recording layer 18. In this case, the pressure sensitive adhesive layer 20 is formed from a pressure sensitive adhesive precursor, having a viscosity of 400 to 4,000 cps and preferably comprising an acrylic compound such as isooctyl acrylate, 2-ethylhexylcarbitol acrylate, n-butyl acrylate, isostearyl acrylate and urethane acrylate by radiation curing using a radiation, such as ultraviolet radiation or electron beam. It is particularly preferred that the adhesive precursor consists of urethane acrylate, because such precursor can ensure a high curing speed suitable for the effective production of the optical disk. As described above, the pressure sensitive adhesive layer 20 has a storage modulus of $1.0\times10^4$ to $1.0\times10^7$ dyn/cm$^2$ at 25° C. and a gel fraction of not less than 50%. For a storage modulus of less than about $1.0\times10^4$ dyn/cm$^2$ at 25° C., as a result of reduction of the aggregation power of the pressure sensitive adhesive layer, the adhesive layer may flow from a peripheral portion of the bonded disk. Further, a storage modulus above $1.0\times10^7$ dyn/cm$^2$ may reduce an adhesion property, thereby possibly causing insufficient bonding. In view of the moderation of the stress, the storage modulus is preferably in the range of $1.0\times10^4$ to $2.0\times10^6$ dyn/cm$^2$, more preferably, in the range of $5.0\times10^4$ to $2.0\times10^6$ dyn/cm$^2$. The gel fraction is preferably not less than 70%, more preferably not less than 80%, because separation between the substrates and creation of bubbles in the pressure sensitive adhesive layer can be more effectively inhibited. The pressure sensitive adhesive layer 20 is homogeneous and has substantially even thickness. As a result, information recorded on the first recording layer 16 can be read through the second recording layer 18 at an excellent signal to noise (S/N) ratio.

Application of a laser beam from an optical head to the optical disk 10 having the above construction permits recording and reading of information. For example, information recorded on the second recording layer 18 may be read therefrom by focusing a laser beam L1 on the second recording layer 18 as shown in FIG. 1. Further, information may be read from the first information recording layer 16 by focusing a laser beam L2 on the first information recording layer 16 through the semitransparent second information recording layer 18.

The embodiment of the optical disk shown in the drawing, which has two information recording layers and permits recording and reading of information to be performed through one side of the disk, has been described above. However, it should be noted that the optical disk of the present invention is not limited to this embodiment. Specifically, the optical disk of the present invention may have one information recording layer, which permits recording and reading of information to be performed from one side. Further, it may have one or two information recording layers, which permits recording and reading of information to be performed from both sides of the disk. Otherwise, the optical disk of the present invention may be such that recording or reading of information is performed by utilizing photomagnetic effect or phase change.

The bonded optical disk according to the present invention may be produced by sequentially carrying out the following steps:

forming a pressure sensitive adhesive precursor layer having a viscosity of 10 to 5,000 cps on at least one surface of a first substrate and a second substrate;

applying radiation directly to the pressure sensitive adhesive precursor layer to form a pressure sensitive adhesive layer which preferably has a gel fraction of not less than 50% and a storage modulus of $1.0\times10^4$ to $1.0\times10^7$ dyn/cm$^2$ at 25° C.; and bonding the first substrate to the second substrate through the pressure sensitive adhesive layer under reduced pressure. These method steps will be described in order. FIG. 2 referred to herein is a perspective view showing, in the sequence of steps, the method for producing the single side dual layer optical disk 10 shown in FIG. 1.

At the outset, as shown in FIG. 2 (A), the above second transparent substrate 14 with an irregular pattern of the semitransparent second information recording layer 18 being formed on the surface thereof is prepared. The second transparent substrate 14 may be prepared from a transparent resin, such as polycarbonate, by injection molding. At the time of molding, a desired irregular pattern is imparted to the surface of the substrate by a master stamper constituting a part of the mold. A second information recording layer 18 having desired thickness is formed by vacuum deposition or the like on the surface of the second transparent substrate 14 with an irregular pattern being formed thereon.

Figure 2A:
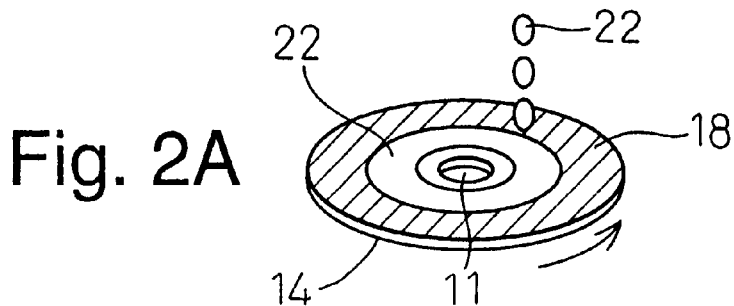
FIGS. 2A through 2D are a perspective view showing, in the sequence of steps, the method for producing the single side dual layer optical disk shown in FIG. 1.

A pressure sensitive adhesive precursor 22, which can form a pressure sensitive adhesive layer by radiation curing, is evenly coated onto the second recording layer 18 prepared above. In this case, as shown in FIG. 2(A), a spin coating method is adopted wherein the pressure sensitive adhesive precursor 22 is dropped through a nozzle (not shown) of a spin coater on the second recording layer 18 while rotating the second transparent substrate 14 in a direction indicated by an arrow. The pressure sensitive adhesive precursor 22 should have a viscosity of 10 to 5000 cps in order to form a homogeneous pressure sensitive adhesive layer having desired even thickness on the second information recording layer 18.

Instead of the spin coating, for example, screen printing, roll coating or the like may be used to coat the pressure sensitive adhesive precursor 22.

Figure 2B:

After the completion of the coating of the pressure sensitive adhesive precursor 22, the pressure sensitive adhesive 22 is cured to form a pressure sensitive adhesive layer. To this end, as shown in FIG. 2(B), a radiation suitable for curing the pressure sensitive adhesive precursor, for example, ultraviolet radiation (UV), gamma (g) radiation, or electron beam (UV in the embodiment shown in the drawing), is applied to the whole surface of the second transparent substrate 14 for a predetermined period of time of several seconds to several ten seconds. At that time, unlike the prior art method wherein UV enters though the semitransparent second information recording layer 18, the applied UV directly enters the pressure sensitive adhesive precursor 22. As a result, use of low-intensity UV suffices for efficient curing reaction to form a pressure sensitive adhesive layer in a short time. The formation of the pressure sensitive adhesive layer 20 in a short time may be achieved also by using g radiation, or electron beam instead of UV as the radiation.

Figure 2C:
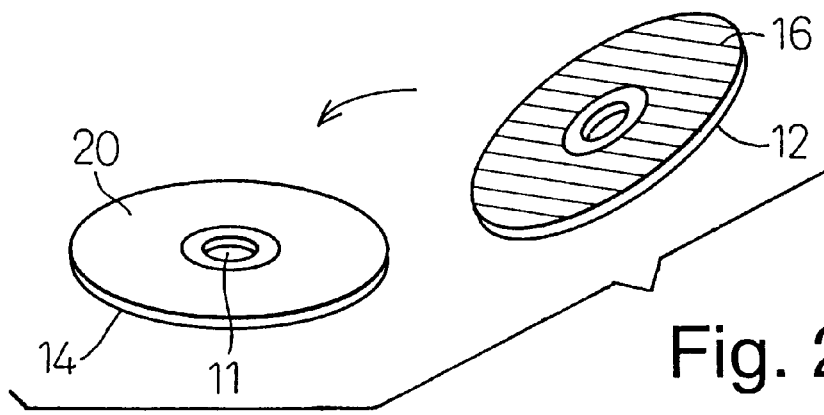
Figure 2D:
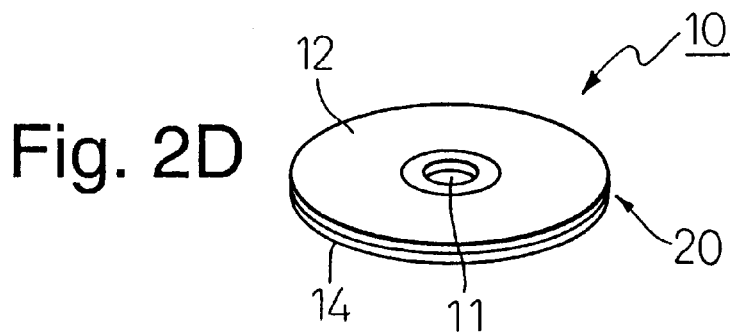

Next, as shown in FIG. 2(C), the first transparent substrate 12 having thereon the first information recording layer 16 is then bonded onto the second transparent substrate 14 having thereon the pressure sensitive adhesive layer 20 so that the first information recording layer 16 faces the pressure sensitive adhesive layer 20, that is, a second information recording layer (not shown). The first transparent substrate 12 used herein has thereon an irregular pattern of the first information recording layer 16 formed of a metal, such as aluminum and may be produced in substantially the same manner as used in the second transparent substrate 14. As shown in FIG. 2(D), the bonding operation provides an optical disk 10 comprising a first transparent substrate 12 and a second transparent substrate 14 integrally bonded to each other.

Figure 3:
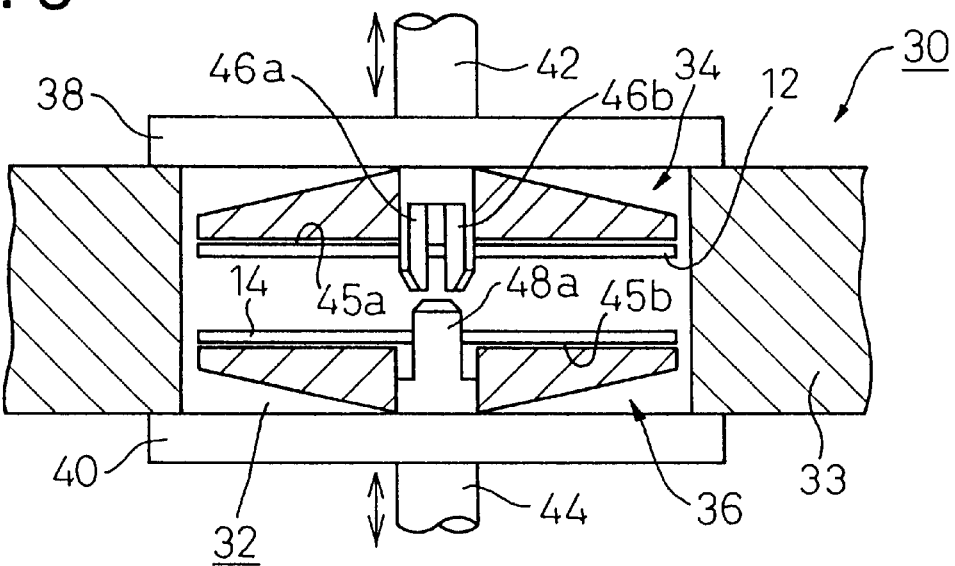
FIG. 3 is a sectional side view of an apparatus, for bonding substrates, used in the production of the optical disk shown in FIG. 1.

Bonding of the first transparent substrate 12 onto the second transparent substrate 14 may be performed by various techniques known in the art. In the production of the optical disk according to the present invention, however, the bonding can be advantageously carried out under reduced pressure by using an apparatus 30 for bonding substrates as shown in FIG. 3.

The apparatus 30 for bonding substrates will be described in detail with reference to FIG. 3. A first opening 34 and a second opening 36 are provided, in a vacuum chamber 32, so as to face each other through a body 33 of the vacuum chamber 32. Further, the first opening 34 and the second opening 36, as described below, are closed respectively with a first cover section 38 and a second cover section 40 removable by moving a shaft. Thus, the interior of the vacuum chamber 32 can be hermetically sealed. In particular, simultaneous opening or closing of the first cover section 38 and the second cover section 40 to create or release vacuum permits the substrates to be more efficiently withdrawn from or introduced into the vacuum chamber 32 in a shorter time. An evacuating device (not shown), which can evacuate the interior of the vacuum chamber 32 to a predetermined pressure of not more than 1 mTorr, is connected to the vacuum chamber 32.

A cylindrical first shaft 42 is provided in the first cover section 38 so that the first shaft 42 is passed through the cover section 38 and movable in a direction indicated by an arrow. Likewise, a cylindrical second shaft 44 is provided in the second cover section 40 so that the second shaft 44 is passed through the cover section 40 and movable in a direction indicated by an arrow. In this case, the first shaft 42 and the second shaft 44 may be respectively connected to linear motion mechanisms (not shown) so that they can be moved toward the above direction. Thus, the end section of the first shaft 42 and the end section of the second shaft 44 can come close to each other from the opposite direction.

Basically, the end section of the first shaft 42 and the end section of the second shaft 44 in each circumferential portion of the opening can support the substrate 12 or 14. More specifically, the front end of the end section in the first shaft 42 and the front end of the end section in the second shaft 44 are disposed respectively within the opening of the substrate 12 and the opening of the substrate 14. In this case, moving the first shaft 42 and the second shaft 44 permits the end section of the first shaft 42 and the end section of the second shaft 44 to come close to each other from the opposite direction, resulting in intimate contact of the substrate 12 and the substrate 14 with each other.

Figure 4:
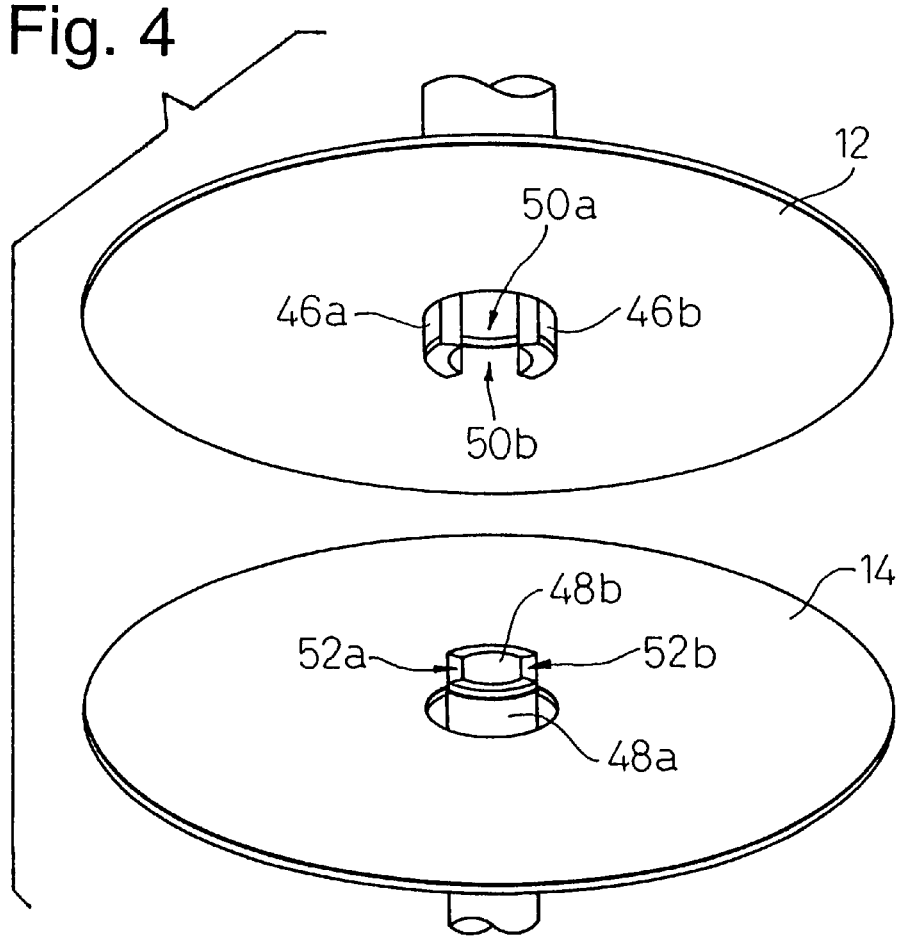
FIG. 4 is an enlarged perspective view showing the construction of a front end of each shaft in the apparatus for bonding substrates shown in FIG. 3.

Preferably, as shown in FIG. 4 as an enlarged view, in each front end section of the first shaft 42 and the second shaft 44, pawl sections 46a, 46b, 48a, and 48b are integrally provided at given intervals in the peripheral direction so that they can be mechanically or electrically moved with rocking between the circumferential portion and the center portion. When the pawl sections 46a, 46b, 48a, and 48b are disposed in the center portion, they can be easily inserted into the opening of the first transparent substrate 12 and the opening of the second transparent substrate 14. On the other hand, when the pawl sections 46a, 46b, 48a, and 48b inserted into the opening of the first transparent substrate 12 and the opening of the second transparent substrate 14 are disposed in the circumferential portion, they can securely support the first transparent substrate 12 and the second transparent substrate 14.

Further, the shape and the size of the pawl sections 46a and 46b in the first shaft 42 are such that they can satisfactorily enter respectively a gap 52a and a gap 52b provided between the pawl sections 48a and 48b in the second shaft 44. Likewise, the shape and the size of the pawl sections 48a and 48b in the second shaft 44 are such that they can satisfactorily enter respectively a gap 50a and a gap 50b provided between the pawl sections 46a and 46b in the first shaft 42. In this case, when the first and second shafts 42 and 44 are allowed to come close to each other to insert the pawl sections 46a and 46b and the pawl sections 48a and 48b respectively into the gaps 52a and 52b and the gaps 50a and 50b facing the pawl sections, the opposed faces are brought into contact with each other to create a predetermined pressing power. The pressing power or pressure applied to the opposed faces is preferably in the range of 0.01 to 0.5 kg/cm$^2$ for 0.1 to 10 sec, more preferably, in the range of 0.05 to 0.11 kg/cm$^2$ for about one hour. Consequently, the apparatus 30 for bonding substrates can intimately contact the first transparent substrate 12 and the second transparent substrate 14 with each other through a pressure sensitive adhesive layer having given thickness to effect desired bonding of substrates. Preferably, in order to equalize the pressure created in the opposed faces in the pawl sections located in the front ends of the shafts 42 and 44, supporting faces 45a and 45b for mutually contact-bonding the first transparent substrate 12 and the second transparent substrate 14 are provided so as to face each other in the shafts 42 and 44.

Further, since the bonding of the substrates according to the present invention is performed under reduced pressure or in vacuo, bubbles in the pressure sensitive adhesive layer are not typically found in the course of bonding. That is, in the optical disk, a pressure sensitive adhesive layer free from bubbles is formed as a medium serving to bond the substrates. This, therefore, can improve the quality of the bonded optical disk.

Although the production of the bonded optical disk according to the present invention has been described above with reference to one preferred embodiment shown in FIGS. 2, 3, and 4, it is needless to say that the present invention is not limited to the preferred embodiment. For example, in the production of the optical disk according to the present invention, since a radiation, such as ultraviolet light, is applied directly to the pressure sensitive adhesive precursor, the application site of the pressure sensitive adhesive layer can be widely varied. For example, the pressure sensitive adhesive layer may be formed on the first transparent substrate rather than the second transparent substrate. Alternatively, the pressure sensitive adhesive layer may be formed on both the second transparent substrate and the first transparent substrate.

Figure 5:
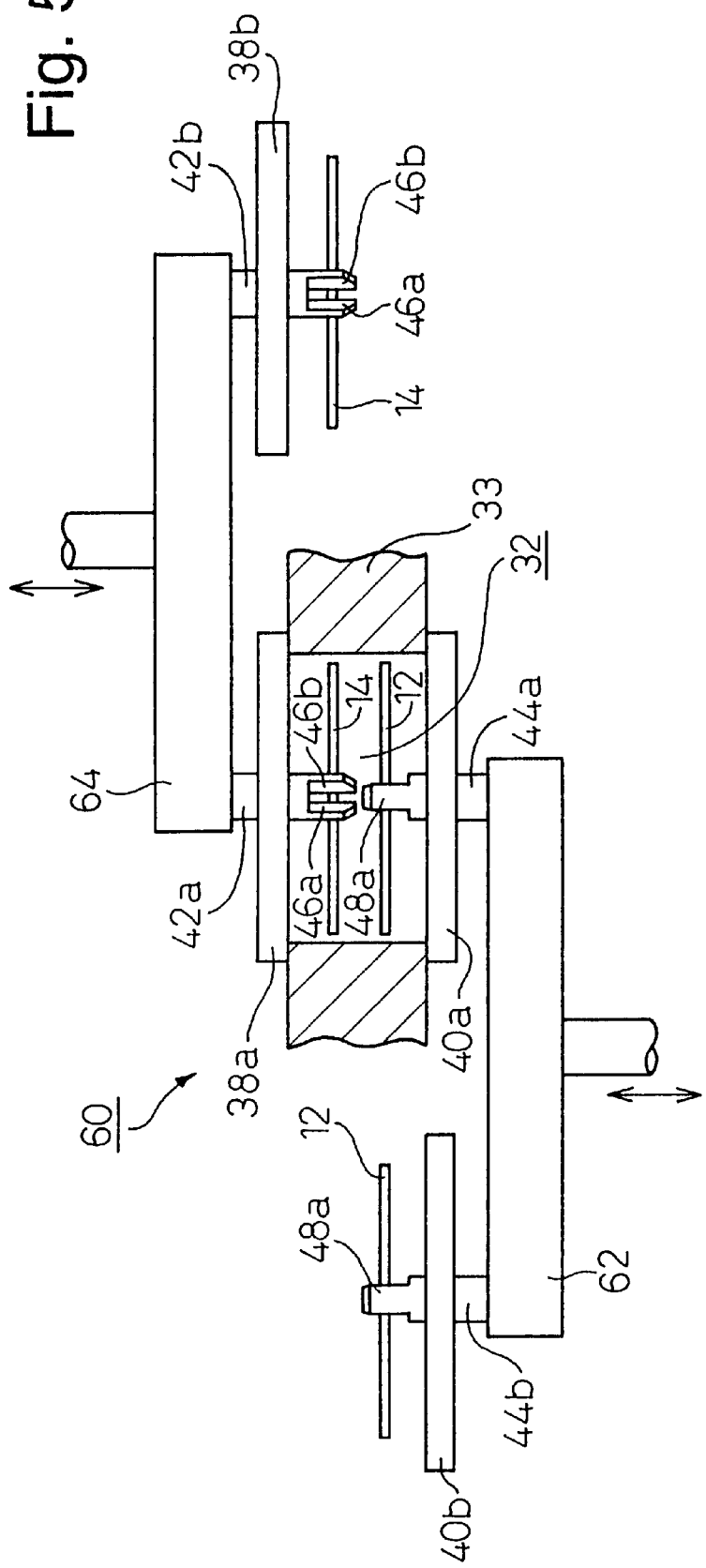
FIG. 5 is a sectional side view showing one variant of the apparatus for bonding substrates shown in FIG. 3.

Further, the apparatus for bonding the substrates used in the production of the optical disk according to the present invention is not limited to the embodiment described above with reference to FIGS. 3 and 4 and may be widely varied so far as it falls within the scope of the present invention. For example, as shown in FIG. 5, the apparatus 60 for bonding substrates may have two rotators 62 and 64 movable in a direction indicated by an arrow. The rotator 62 may have, in its circumferential portion, a set of a cover section 40a and a shaft 44a and a set of a cover section 40b and a shaft 44b, and the rotator 64 may have, in its circumferential portion, a set of a cover section 38a and a shaft 42a and a set of a cover section 38b and a shaft 42b. In this case, during the course of the bonding of substrates, the first and second transparent substrates coated with a pressure sensitive adhesive precursor may be supported on the pawl section. This can shorten the time taken from the coating of the pressure sensitive adhesive precursor to the bonding of the substrates, resulting in significantly improved throughput of the optical disk.

Figure 6:
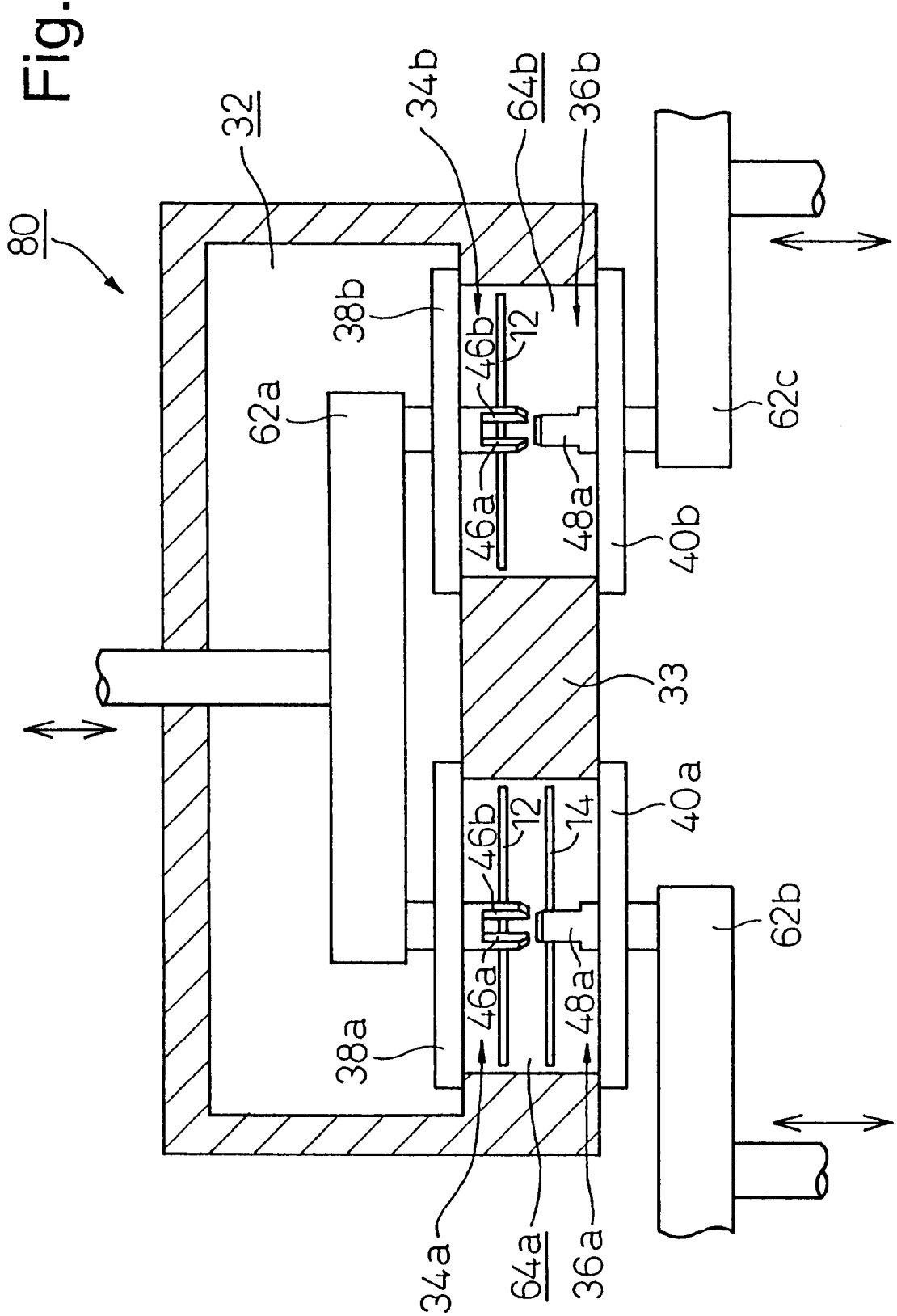
FIG. 6 is a sectional side view showing another variant of the apparatus for bonding substrates shown in FIG. 3.

Otherwise, an apparatus 80, for bonding substrates, schematically shown in FIG. 6, may be used. As shown in FIG. 6, the apparatus 80 for bonding substrates comprises three rotators 62a, 62b, and 62c, and one of these rotators, i.e., the rotator 62a, is housed in the vacuum chamber 32. The vacuum chamber 32 may have two load lock chambers 64a and 64b, and each load lock chamber has opposed openings 34a and 36a and opposed openings 34b and 36b. Among these openings 34a, 34b, 36a, and 36b, the openings 34a and 34b provided within the vacuum chamber 32 are hermetically sealed with the cover sections 38a and 38b of the rotator 62a housed in the vacuum chamber 32, and the openings 36a and 36b provided outside the vacuum chamber 32 are hermetically sealed with the cover sections 40a and 40b of the remaining rotators 62b and 62c.

In the case of the apparatus 80, for bonding substrates, having the above construction, during the bonding of substrates in one load lock chamber 64a, the first transparent substrate 12 and the second transparent substrate 14 may be supported on the pawl sections 46a, 46b, 48a, and 48b within the other load lock chamber 64b under atmospheric pressure followed by evacuation of the load lock chamber 64b to a predetermined pressure. Therefore, use of this apparatus enables the evacuation time, necessary for bonding of the substrates, to be further shortened, leading to further improved throughput of the optical disk.

In another embodiment thereof, the present invention resides in the bonded optical disk having the structure which is basically similar to that of the above-described bonded optical disk. That is, the present optical disk is provided with a first transparent substrate, a second transparent substrate, a light-permeable adhesive layer for bonding said first substrate with said second substrate, and at least one information recording layer provided between the first substrate, the second substrate and the adhesive layer. The principal differences between the above-described bonded optical disk and the bonded optical disk which will be described hereinafter reside in that, as will be described in detail hereinafter, the latter uses an adhesive, particularly an adhesive derived from a radiation-curable adhesive precursor having a high viscosity, in place of a pressure sensitive adhesive, and the sequence of bonding the substrates is varied to prevent inclusion of bubbles in the adhesive layer, while retaining the characteristics of the adhesive used. Note, in the following descriptions of the present invention, detailed description of the parts or elements which can be commonly used in the above-described optical disk will be omitted to avoid duplication of the description.

The optical disk of the present invention has a structure comprising a first transparent substrate bonded to a second transparent substrate through a light-permeable adhesive layer, and, in addition, for information recording, a recording layer is provided on the surface of at least one of the first and second substrates, that is, on the adhesive layer side of the substrate. As previously described, there are various types of bonded optical disks having such a structure.

The first and second, transparent substrates of the optical disk, as has been already described, can be formed from transparent plastic materials, such as acrylic resin, polycarbonate resin and the like, by conventional molding methods including injection molding. With regard to the transparent substrates, the above descriptions should be referred to.

Further, irregular patterns or irregular pits corresponding to information signals to be recorded on the optical disk, such as images and sounds, are provided on the surface, on which the recording layer is to be formed, among the surfaces of the transparent substrates. Furthermore, a thin film of a metallic material, a ceramic material or the like suitable for the formation of a reflection or semitransparent type recording layer can be applied onto the formed irregular pattern or the like. With regard to the formation of the irregular pattern and the like, and the formation of the recording layer, the above descriptions should be also referred to.

In the optical disk of the present invention, the first transparent substrate and the second transparent substrate are bonded to each other through a light-transmittive adhesive layer. In particular, the present invention is characterized in that the adhesive layer interposed for bonding the substrates to each other is formed from a radiation-curable adhesive precursor having a high viscosity of 500 cps or more, by subjecting the adhesive precursor to radiation curing, after the first substrate and the second substrate were bonded with the adhesive precursor.

It is necessary that the radiation-curable adhesive precursor used in the formation of an adhesive layer has a viscosity of 500 cps or more, and the viscosity is preferably 500 to 10,000 cps, more preferably 1,000 to 5,000 cps. This is because, for the optical disk of the present invention, it is desired to use the adhesive precursor having a high enough viscosity so that a thickness of the adhesive precursor is constantly retained when a pair of the disk substrates are bonded after the selected adhesive precursor was previously coated at uniform thickness over the disk substrates through spin coating or other methods. On the other hand, it is necessary that the adhesive precursor has a viscosity which enables to easily coat the same at a desired thickness in practical uses. Further, an excessively low level of the adhesive precursor, after coating of and before radiation curing of the adhesive precursor, can cause dropping of the precursor at the peripheral portion of the substrates. Note for the viscosity of the radiation-curable adhesive precursor used herein that it may be higher than 10,000 cps, if it does not adversely affect the effects of the present invention.

The adhesive precursor used in the practice of the present invention may be suitably selected from the compounds satisfying the above requirements. However, ultraviolet (UV) curable or electron beam (EB) curable adhesive precursors are preferred from the viewpoints of availability, curing time, curing conditions, radiation irradiation means for curing, and the like. Suitable examples of the UV curable or EB curable adhesive precursors, although they are not restricted to, include acrylic compound-based adhesive precursors such as isooctyl acrylate, 2-ethylhexyl carbitol acrylate, n-butyl acrylate, isostearyl acrylate, and an urethane acrylate. Particularly suitable UV curable adhesive precursor is a mixture of urethane acrylate (UA) and hydroxypropyl acrylate (HPA) having added thereto a photopolymerization initiator. For example, the adhesive precursors having the following composition (ratio is "parts by weight") can be advantageously used.

| Composition | UA | HPA | photo-polymerization initiator | viscosity (cps) |
| --- | --- | --- | --- | --- |
| 1 | 50 | 50 | 1 | 2000 |
| 2 | 40 | 60 | 1 | 800 |
| 3 | 60 | 40 | 1 | 2950 |

A urethane acrylate (UA) which is commercially available is one available under the trade designation "UV 3000B"; manufactured by Nippon Synthetic Chemical Industry Co., and a photopolymerization initiator which is commercially available is one available under the trade designation "Darocur 1173"; manufactured by Merck (Japan).

Further, coating of the adhesive precursor onto the substrate can be advantageously carried out by a conventional coating method, such as spin coating, screen printing, or roll coating. The coating thickness may vary depending upon the desired bond strength and other factors, and suitably may be in the range of several microns to several ten microns.

In addition to the above-described requirements, for the optical disk of the present invention, it is necessary that the adhesive precursor used for the formation of an adhesive layer of the optical disk, after bonding of the first substrate with the second substrate through the adhesive precursor in vacuum or under a reduced pressure and before radiation curing of the adhesive precursor, is subjected to a pressure higher than an atmospheric pressure. As a result of application of such a higher pressure, the adhesive precursor, due to its higher viscosity, can eliminate application of remarkably increased pushing power and rotation of the disk for removing an excess amount of the adhesive therefrom, when the first substrate is bonded with the second substrate through the adhesive precursor. Accordingly, it becomes possible to prevent unevenness of the thickness of the adhesive precursor, and, as a result of application of the higher pressure, to effectively remove bubbles, produced due to the trapped airs or the gaseous substance evaporated or vaporized from the adhesive precursor, in the adhesive precursor. According to the present invention, since the applied higher pressure can affect the bubbles produced in the adhesive precursor, the bubbles can be again dissolved in the same adhesive precursor. Moreover, as will be appreciated by a person skilled in the art, according to the present invention, the removal of bubbles can be also accomplished, even if a pressure sensitive adhesive precursor is used in place of the above-described adhesive precursor.

One embodiment of the above-described bonded optical disk according to the present invention may be similar to the single side dual layer type optical disk which has been described above with reference to FIG. 1. That is, the optical disk 10 is constituted from two transparent substrates 12 and 14 made of a polycarbonate resin, and a surface of each substrate has an irregular pattern formed thereon. Each of the substrates has in its center portion an opening 11. Further, a first information recording layer 16 is disposed on the first transparent substrate 12, and a second information recording layer 18 is disposed on the second transparent substrate 14. Furthermore, a light-permeable adhesive layer 20 is provided between the first information recording layer 16 and the second information recording layer 18. The adhesive layer 20 is formed upon curing of the adhesive precursor as a function of ultraviolet irradiation.

In the optical disk 10 having the above-described constitution, information recorded on the second recording layer 18 may be read therefrom by focusing a laser beam L1 on the second recording layer 18. Further, information may be read from the first informing recording layer 16 by focusing a laser beam L2 on the first information recording layer 16 through the semitransparent second information recording layer 18.

The bonded optical disk according to the present invention can be produced by carrying out, in the described order, the following steps:

applying a radiation-curable adhesive precursor having a viscosity of not less than 500 cps on at least one surface of the first substrate and the second substrate;

combining the first substrate and the second substrate, through the adhesive precursor applied in the above step, under a reduced pressure of, preferably, not more than 1 mTorr;

exposing the adhesive precursor to a pressure higher than an atmospheric pressure, while maintaining the combined state of the first substrate, the second substrate and the adhesive precursor; and irradiating a layer of the adhesive precursor with radiation to cause curing, thereby bonding the first substrate and the second substrate through the adhesive layer. The step of irradiating the adhesive precursor layer with radiation may be carried out by applying radiation to both of the first and second substrates or may be carried out by applying radiation to any one of the first and second substrates. Note that the first substrate, the second substrate and the adhesive precursor each may be the same as those described above with reference to the first embodiment of the optical disk of the present invention.

According to the production method of the present invention, since the first substrate and the second substrate are bonded through a high viscosity adhesive precursor by using the method based on application of a reduced pressure, trapping of air between the substrates on in the adhesive precursor during the bonding step can be effectively prevented. Further, according to the present method, contrary to the prior art methods, it becomes possible to omit the rotation of the whole body of the disk for the purpose of removing an excess amount of the adhesive precursor from the bonded substrates, thereby enabling prevention of a remarkable unevenness of the thickness in the adhesive precursor layer and thus the resulting adhesive layer.

In addition, since, immediately after bonding of the first substrate and the second substrate as described above, a whole body of the disk including the adhesive precursor layer is subjected to a pressure higher than the atmospheric pressure (that is, as described hereinafter, the whole body of the disk is pressurized to the atmospheric pressure or higher pressure due to pressure of gas such as air), it becomes possible to completely remove the bubbles produced due to the evaporated or vaporized gas from the adhesive precursor, in addition to the removal of the bubbles due to the trapped air. In practice, according to the method of the present invention, finely divided bubbles which are unable to be visually detected can be removed from the adhesive precursor.

Preferably, the bonded optical disk according to the present invention can be produced in accordance with the following procedure.

(1) A UV-curable adhesive precursor having a viscosity of 500 cps or more is spin-coated at a predetermined thickness on a surface (adhesion surface) of each of the first disk substrate and the second disk substrate.

(2) In a vacuum container, the first disk substrate and the second disk substrate are disposed while retaining their opposed state in which the adhesive precursor layer coated over a surface of each disk substrate is sandwiched with the disk substrates.

(3) While adjusting a space between the two disk substrates with the adhesive precursor layer to a level of reduced pressure, the disk substrates are bonded as a function of falling of the upper disk substrate due to its own weight.

(4) While the first disk substrate, the second disk substrate and the adhesive precursor layer are maintained at the bonded state (i.e., as the so-called "optical disk precursor") in the vacuum container which can act herein a pressurizing container), a compressed air is introduced into the vacuum container to pressurize the optical disk precursor, thereby dissolving again the fine bubbles, which have been already dispersed in the adhesive precursor layer upon evaporation or vaporization of the substance from the adhesive precursor, in the adhesive precursor.

(5) Using an ultraviolet exposure source, for example, built in the vacuum container, the adhesive precursor layer is irradiated through one of the substrates with the ultraviolet radiation at a predetermined dose to thereby form an adhesive layer as a result of curing of the adhesive precursor.

The production method of the present invention is completed, after the optical disk produced through the above-described series of the steps is removed from the vacuum container. In this connection, it should be noted that the ultraviolet irradiation of the adhesive precursor layer may be carried out in an atmospheric pressure, and that each step in the described production method may be the same as that of the production method described above with reference to FIG. 2, except that the sequence or order of the steps is different and therefore some of the steps must be modified.

Figure 7:
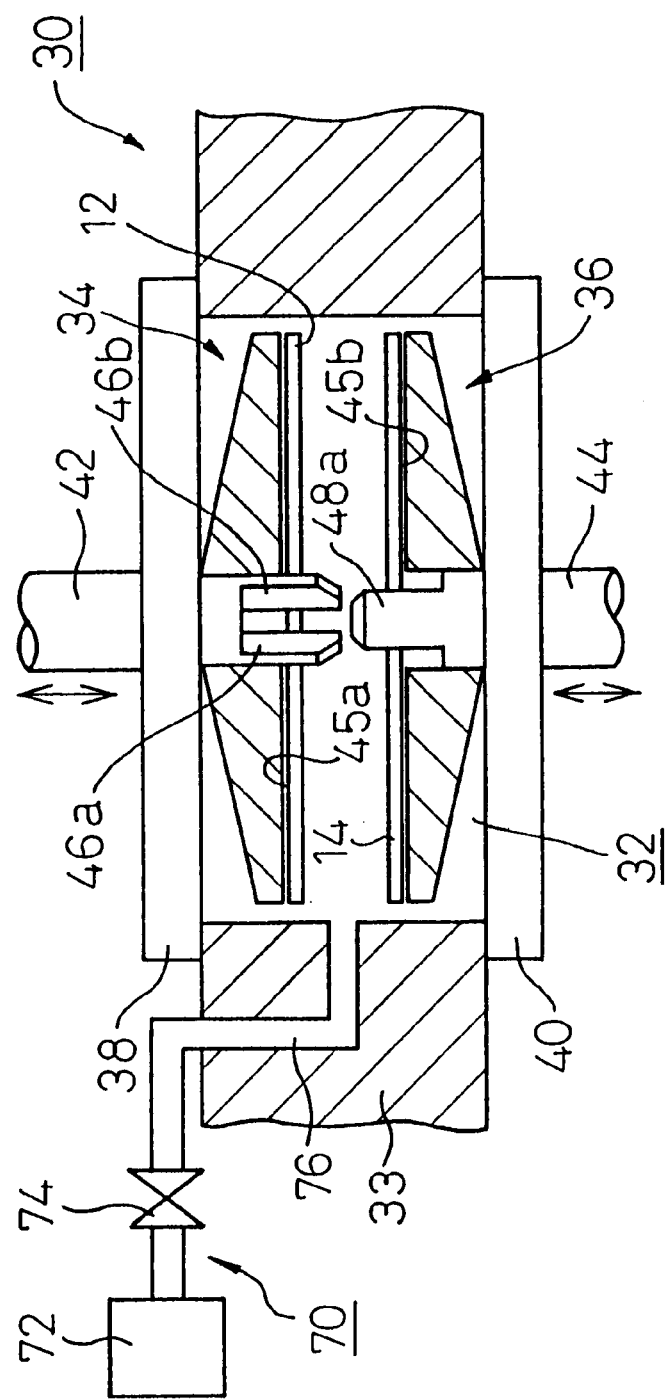
FIG. 7 is a sectional side view showing the constitution of the substrate bonding apparatus of FIG. 3 which further comprises a pressurizing apparatus.
Figure 8:
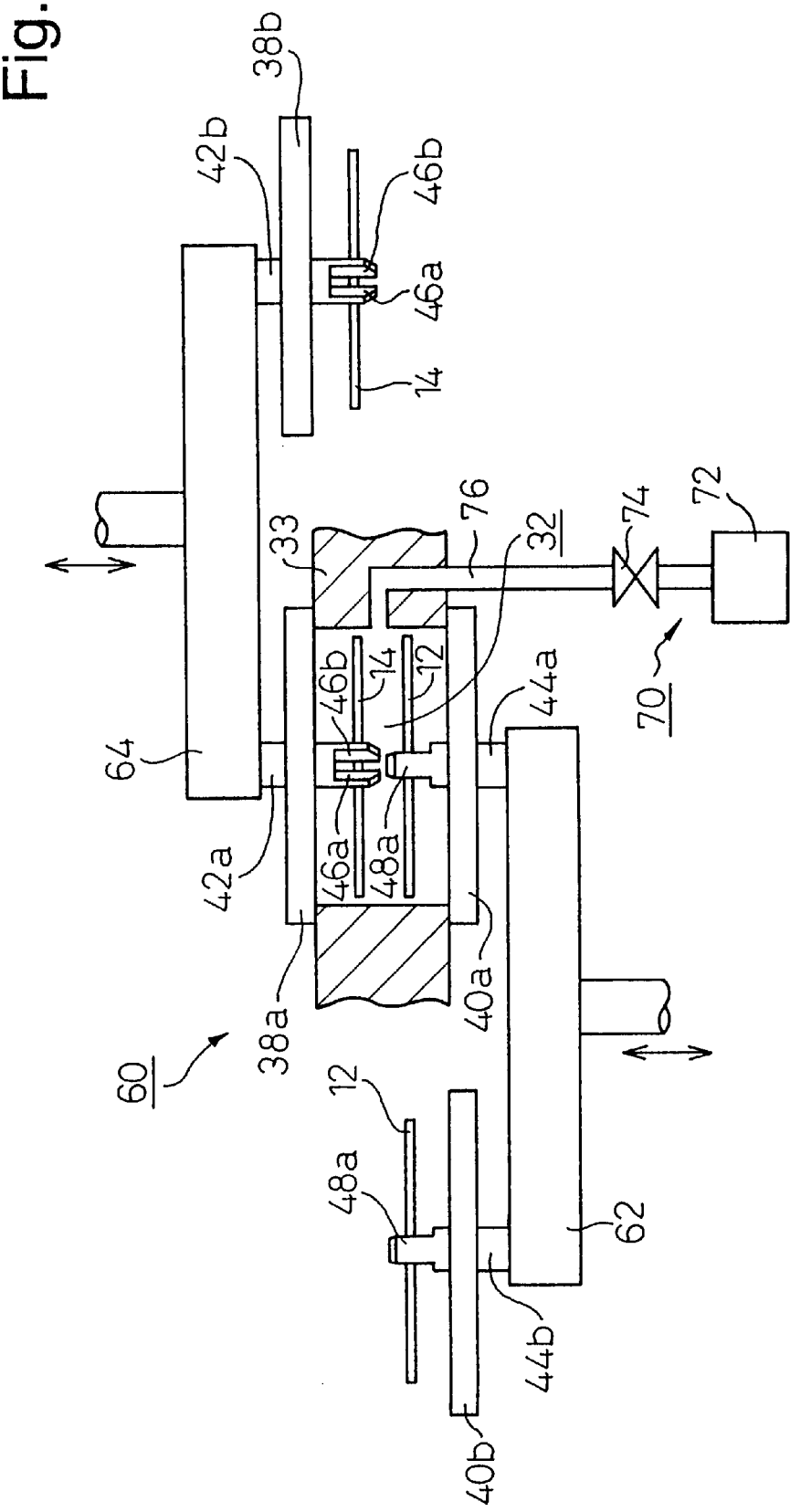
FIG. 8 is a sectional side view showing the constitution of the substrate bonding apparatus of FIG. 5 which further comprises a pressurizing apparatus.

As a principle, the production of the bonded optical disk according to the present invention, i.e., the bonded optical disk which comprises the first transparent substrate and the second transparent substrate, each having an opening in a center portion thereof, a light-permeable adhesive layer bonding the first substrate and the second substrate, and at least one information recording layer provided between the first substrate, the second substrate and the adhesive layer, can be advantageously carried out by using the apparatus which is similar to the production apparatus described above with reference to FIGS. 3 to 6, and, for example, such production can be carried out by using the production apparatuses illustrated in FIGS. 6 and 7. Accordingly, the detailed description concerning the production apparatus used herein will be omitted.

The principal differences of the production apparatus used herein from the above-described production apparatus reside in that the vacuum chamber has, connected therewith, an apparatus for supplying a pressurized gas as a pressurizing apparatus for exposing the first substrate, the second substrate and the adhesive precursor, which are intimately contacted with each other, to a pressure higher than the atmospheric pressure.

Referring to FIGS. 6 and 7 both illustrating the substrate bonding apparatus, the apparatus 70 for supplying a pressurized gas is provided with a supply source 72 of the pressurized gas, and has the constitution that the pressurized gas of the supply source 72 is introduced through a supply conduit 76 of the pressurized gas, provided with a valve 74, to the vacuum chamber 32. In the supply apparatus 70 of the pressurized gas, to connect it with the vacuum chamber 32, a part of the supply conduit 76 of the pressurized gas is embedded in a body 33 of the vacuum chamber 32.

Further, a radiation irradiation apparatus for curing a radiation-curable adhesive precursor capable of forming an adhesive layer, if it is explained with reference to the substrate bonding apparatus 30 of FIG. 7, may comprise one or more radiation irradiation devices (for example, UV lamps; not shown) which are disposed at the predetermined sites in the spaces (openings) 33 and 34 adjacent to the transparent substrates 12 and 14 in the vacuum chamber 32. The radiation irradiation devices may be fixedly disposed, insofar as they do not adversely affect handling of the substrates, or alternatively they may be removably or freely movably disposed through the cover sections.

More particularly, the apparatus 70 for supplying the pressurized gas, as is briefly described in the above paragraphs, may be formed so that a pressurized air or inert gases such as nitrogen or argon is introduced into a body 33 of the vacuum chamber 32. Note, however, that the supply apparatus 70 of the pressurized gas may have other constructions than the illustrated construction in which the supply conduit 76 of the pressurized gas is embedded in the body 33. Although it is not illustrated, the supply conduit of the pressurized gas may be connected with a gas introduction opening provided in one or both of the cover sections 38 and 40 or alternatively other element or section of the vacuum chamber 32. Further, the pressurizing apparatus should not be restricted to the above-described supply apparatus of the pressurized gas, and, for example, it may be a pressurizing container connected with the vacuum chamber capable of pressuring the vacuum chamber. Furthermore, in the production apparatus of the present invention, preferably, it has a mechanism in which two disk substrates are superposed based on falling of the upper disk substrate due to its own weight, while producing a reduced pressure between the adhesive precursor layers of the disk substrates. The above mechanism may relies upon the mechanical chuck mechanism described above with reference to FIG. 4.

EXAMPLES

The present invention will be described in more detail with reference to the following examples. It is needless to say that the present invention is not limited to these examples only. In the following examples, "parts" are by weight unless otherwise specified. Note that the term "gel fraction" used herein is intended to mean a weight percent of the insoluble sample when the sample was immersed in a solvent such as methyl ethyl ketone at 25° C. for one day.

Example 1

A mixed solution composed of 90 parts of isooctyl acrylate, 10 parts of acrylic acid, and 0.04 part of a photoinitiator commercially available under the trade designation "Irgacure 651", manufactured by CIBA-GEIGY, as a photoinitiator was prepared and then placed in a nitrogen atmosphere.

The mixed solution was then irradiated with an ultraviolet radiation, having a wavelength of 200 to 400 nm, from an ultraviolet source to perform photopolymerization. When this reaction proceeded to a viscosity of about 500 cps as measured with a Brookfield viscometer, the ultraviolet irradiation was stopped to prepare a pressure sensitive adhesive precursor.

0.08 part of hexanediol diacrylate and 0.1 part of "Irgacure 651" were added to the pressure sensitive adhesive precursor to prepare a pressure sensitive adhesive syrup.

Thereafter, the pressure sensitive adhesive syrup was evenly spin-coated onto a transparent circular substrate made of a polycarbonate to form a 28 $\mu$m-thick coating.

The circular substrate coated with the pressure sensitive adhesive syrup was then placed in a container which had been purged with nitrogen. The coating was then irradiated with an ultraviolet radiation from the ultraviolet source for 10 sec, thereby fully curing the pressure sensitive adhesive syrup to evenly form a 28 $\mu$m-thick pressure sensitive adhesive layer on the circular substrate. The storage modulus of the pressure sensitive adhesive layer was measured at the frequency of 1 rad/sec with an Rheometrics Dynamic Analyzer (RDA) viscoelastic spectrometer manufactured by Rheometrics Inc., and, as given in Table 1, was found to be 2.4×10$^5$ dyn/cm$^2$ at 25° C. Further, the cured pressure sensitive adhesive layer was immersed in methyl ethyl ketone, and the amount of the insoluble in weight percent, that is, the gel fraction, was measured and found to be 69%.

Two circular substrates having the above pressure sensitive adhesive layer were prepared. Thereafter, they were provided in a bonding apparatus, shown in FIG. 3, in its a predetermined position, and bonded to each other under a reduced pressure of 1.0 Torr to prepare a basic structure of a bonded optical disk. This basic structure was taken out of the apparatus and visually inspected for the appearance. As a result, it was found that the two circular substrates were strongly bonded to each other through a bubble-free pressure sensitive adhesive layer. The basic structure was also subjected to an environmental test. In the environmental test, the basic structure was placed under an environment of 50° C. and 95% RH for 200 hr, and the appearance thereof was then visually inspected. In this case, it was visually inspected for separation between the circular substrates and the presence of bubbles in the pressure sensitive adhesive layer. The results of the visual inspection are summarized in Table 1. As is apparent from Table 1, the two circular substrates remained bonded to each other through a bubble-free pressure sensitive adhesive layer under high temperature and high humidity conditions.

Example 2

50 parts of 2-ethylhexyl carbitol acrylate, 50 parts of an oligomer commercially available under the trade designation "NK-Oligo U-340AX" manufactured by Shin-Nakamura Chemical Co., Ltd., and one part of a photoinitiator commercially available under the trade designation "Darocur 1173" manufactured by Merck (Japan) were mixed together to prepare a pressure sensitive adhesive precursor. The viscosity of the pressure sensitive adhesive precursor was measured in the same manner as in Example 1 and, as given in the following Table 1, was found to be 820 cps.

The pressure sensitive adhesive precursor was evenly spin-coated on two circular substrates made of polycarbonate to a thickness of 28 $\mu$m in the same manner as in Example 1, followed by full curing of the pressure sensitive adhesive precursor in a nitrogen atmosphere. As a result, it was found that a 28 $\mu$m-thick pressure sensitive adhesive layer was evenly formed on the circular substrates. The storage modulus and the gel fraction of the pressure sensitive adhesive layer were measured in the same manner as in Example 1 and, as given in Table 1, were found to be respectively 6.1×10$^5$ dyn/cm$^2$ and 91%.

The two circular substrates were then bonded to each other. Further, an environmental test was performed in the same manner as described above. In this case, an appearance test was performed before and after the environmental test. As a result, no separation was observed between the circular substrates, and no bubbles were present in the pressure sensitive adhesive layer, indicating that, even under high temperature and high humidity environment, the two circular substrates remained bonded to each other through the pressure sensitive adhesive layer without creating any bubble in the pressure sensitive adhesive layer.

Example 3

80 parts of n-butyl acrylate was mixed with 0.04 part of "Darocur 1173" as a photoinitiator, and the mixture was placed in a nitrogen atmosphere and then irradiated with an ultraviolet radiation to prepare a pressure sensitive adhesive syrup.

10 parts of urethane acrylate "UV 3000B" manufactured by Nippon Synthetic Chemical Industry Co., Ltd., 10 parts of hydroxypropyl acrylate, and 1 part of "Darocur 1173"

were then added to this pressure sensitive adhesive syrup to prepare a pressure sensitive adhesive precursor having a viscosity of 480 cps as measured by the above method. The pressure sensitive adhesive precursor was evenly spin-coated onto two circular substrates in the same manner as in Example 1 to a thickness of 28 µm, and the coating was fully cured by ultraviolet irradiation in a nitrogen atmosphere. In this case, it was found that a 28 µm-thick pressure sensitive adhesive layer could be evenly formed on the circular substrates. The storage modulus and the gel fraction of the pressure sensitive adhesive layer were measured in the same manner as in Example 1 and, as given in Table 1 below, were respectively $1.2 \times 10^5$ dyn/cm$^2$ and 74%.

The two circular substrates were then bonded to each other. Further, an environmental test was performed in the same manner as described above. In this case, an appearance test was performed before and after the environmental test. As a result, no separation was observed between the circular substrates, and no bubbles were present in the pressure sensitive adhesive layer, indicating that, even under severe environment, i.e., high temperature and high humidity environment, the two circular substrates remained bonded to each other through the pressure sensitive adhesive layer without creating any bubble in the pressure sensitive adhesive layer.

Example 4

50 parts of isostearyl acrylate was mixed with 0.02 part of "Darocur 1173" as a photoinitiator, and the mixture was placed in a nitrogen atmosphere and then irradiated with an ultraviolet radiation to prepare a pressure sensitive adhesive syrup.

50 parts of 2-ethylhexyl carbitol acrylate, 0.1 part of hexanediol diacrylate, and 1 part of "Darocur 1173" were then added to this pressure sensitive adhesive syrup to prepare a pressure sensitive adhesive precursor having a viscosity of 4000 cps as measured in the same manner as in Example 1. The pressure sensitive adhesive precursor was then evenly spin-coated onto two circular substrate in the same manner as in Example 1 to a thickness of 28 µm, and the coating was fully cured by ultraviolet irradiation in a nitrogen atmosphere. In this case, it was found that a 28 µm-thick pressure sensitive adhesive layer could be evenly formed on the circular substrates. The storage modulus and the gel fraction of the pressure sensitive adhesive layer were measured in the same manner as in Example 1 and, as given in Table 1 below, were respectively $1.5 \times 10^5$ dyn/cm$^2$ and 90%.

The two circular substrates were then bonded to each other. Further, an environmental test was performed in the same manner as described above. In this case, an appearance test was performed before and after the environmental test. As a result, no separation was observed between the circular substrates, and no bubbles were present in the pressure sensitive adhesive layer, indicating that, even under high temperature and high humidity environment, the two circular substrates remained bonded to each other through the pressure sensitive adhesive layer without creating any bubble in the pressure sensitive adhesive layer.

Example 5

50 parts of urethane acrylate "UV 3000B" manufactured by Nippon Synthetic Chemical Industry Co., Ltd., 50 parts of hydroxypropyl acrylate, and 1 part of "Darocur 1173" manufactured by Merck (Japan) as a photoinitiator were mixed together to prepare a pressure sensitive adhesive precursor having a viscosity of 2120 cps as measured by the above method.

The pressure sensitive adhesive precursor was then evenly spin-coated onto two circular substrates made of polycarbonate in the same manner as in Example 1 to a thickness of 28 µm, and the coating was fully cured by ultraviolet irradiation in a nitrogen atmosphere. In this case, it was found that a 28 µm-thick pressure sensitive adhesive layer could be evenly formed on the circular substrates. The storage modulus and the gel fraction of the pressure sensitive adhesive layer were measured in the same manner as in Example 1 and, as given in Table 1 below, were found to be respectively $1.2 \times 10^6$ dyn/cm$^2$ and 98%.

The two circular substrates were then bonded to each other. Further, an environmental test was performed in the same manner as described above. In this case, an appearance test was performed before and after the environmental test. As a result, no separation was observed between the circular substrates, and no bubbles were present in the pressure sensitive adhesive layer, indicating that, even under high temperature and high humidity environment, the two circular substrates remained bonded to each other through the pressure sensitive adhesive layer without creating any bubble in the pressure sensitive adhesive layer.

Example 6

70 parts of 2-ethylhexyl acrylate, 30 parts of isobornyl acrylate, and 0.04 part of "Irgacure 651" as a photoinitiator were mixed together, and the mixture was placed in a nitrogen atmosphere and then irradiated with an ultraviolet irradiation to prepare a pressure sensitive adhesive syrup.

The pressure sensitive adhesive was mixed with 0.5 part of hexanediol diacrylate and 1 part of "Irgacure 651" to prepare a pressure sensitive adhesive precursor having a viscosity of 920 cps as measured in the same manner as in Example 1. The pressure sensitive adhesive precursor was evenly spin-coated onto two circular substrates in the same manner as in Example 1 to a thickness of 28 µm, and the coating was fully cured by ultraviolet irradiation in a nitrogen atmosphere. In this case, it was found that a 28 µm-thick pressure sensitive adhesive layer could be evenly formed on the circular substrates. The storage modulus and the gel fraction of the pressure sensitive adhesive layer were measured in the same manner as in Example 1 and, as given in Table 1 below, were found to be respectively $2.6 \times 10^5$ dyn/cm$^2$ and 73%.

The two circular substrates were then bonded to each other. Further, an environmental test was performed in the same manner as described above. In this case, an appearance test was performed before and after the environmental test. As a result, no separation was observed between the circular substrates, and no bubbles were present in the pressure sensitive adhesive layer, indicating that, even under high temperature and high humidity environment, the two circular substrates remained bonded to each other through the pressure sensitive adhesive layer without creating any bubble in the pressure sensitive adhesive layer.

Comparative Example 1

A basic structure of an optical disk was prepared in the same manner as in Example 6, except that the pressure sensitive adhesive syrup prepared in Example 6 was evenly spin-coated onto two circular substrates to a thickness of 28 µm and the coating was fully cured by ultraviolet irradiation in a nitrogen atmosphere.

In this case, the viscosity of the pressure sensitive adhesive syrup was 920 cps, and the modulus and the gel fraction of the pressure sensitive adhesive layer formed by ultraviolet irradiation were measured and, as given in Table 1, found to be respectively $6.3 \times 10^5$ dyn/cm$^2$ and 10%.

The two circular substrates were then bonded to each other. Further, an environmental test was performed in the same manner as described above. In this case, an appearance test was performed before and after the environmental test. As a result, before the environmental test, no bubbles were observed between the circular substrates, and no cell was present in the pressure sensitive adhesive layer. However, a bubble was observed in the pressure sensitive adhesive layer after the environmental test, indicating that a gel fraction of less than 50% results in deteriorated quality of the optical disk.

nism of the bonding apparatus, while falling the upper substrate by its own weight. Immediately after completion of the bonding of the substrates, the applied vacuum was removed from the bonding apparatus, and an appearance of the adhesive precursor layer of the substrates removed from the apparatus was visually inspected. No bubbles were observed in the layer, however, the subsequent inspection using an optical microscope evidenced that some fine bubbles having a diameter of several ten microns are distributed in the layer.

Thereafter, the two bonded circular substrates were contained in a separate pressurizing container, and pressurization was made by introducing a compressed air at 5 kg/cm$^2$

TABLE 1

|  | Viscosity of syrup before coating, cps | Modulus (25° C.), dyn/cm$^2$ | Bonding property | Gel fraction, % | Environmental test (50° C. 95% PH, 200 hr) |
|---|---|---|---|---|---|
| Ex. 1 | 500 | 2.4E + 05 | Excellent | 69 | Neither separation nor bubbles created |
| Ex. 2 | 820 | 6.1E + 05 | Excellent | 91 | Neither separation nor bubbles created |
| Ex. 3 | 480 | 1.2E + 05 | Excellent | 74 | Neither separation nor bubbles created |
| Ex. 4 | 4000 | 1.5E + 05 | Excellent | 90 | Neither separation nor bubbles created |
| Ex. 5 | 2120 | 1.2E + 06 | Excellent | 98 | Neither separation nor bubbles created |
| Ex. 6 | 920 | 2.6E + 05 | Excellent | 73 | Neither separation nor bubbles created |
| Comp. Ex. 1 | 920 | 6.3E + 04 | Excellent | 10 | bubbles created |

Example 7

Samples Nos. 1 to 13 of the bonded optical disk were produced in accordance with the following method. Note in this example that, in order to ensure an accurate evaluation of the bubble formation and an accurate determination of the thickness of the adhesive layer, two optical disks were produced for each sample number.

Urethane acrylate, "UV 3000B" (UA), manufactured by Nippon Synthetic Chemical Industry Co., Ltd., and hydroxy-propyl acrylate (HPA) in the ratio (parts by weight) described in the following Table 2, and 1 part of "Darocur 1173" manufactured by Merck (Japan) as a photoinitiator were mixed together to prepare a UV-curable adhesive precursor. The viscosity of the resulting adhesive precursor, determined at 25° C. by using a Brookfield-type rotational viscometer, produced by Tokyo Keiki Kabushiki Kaisha, was as follows.

UA/HPA=50/50 . . . 2000 cps;
UA/HPA=40/60 . . . 800 cps, and
UA/HPA=60/40 . . . 2950 cps.

The obtained adhesive precursor was then evenly spin-coated at a predetermined thickness on each single surface of a pair of two transparent circular substrates made of polycarbonate. Spin coating was carried out at the coating speed (rpm) and the coating time (second) described in the following Table 2.

Two circular substrates having the coated adhesive precursor produced in the above step were placed in a predetermined position in a bonding apparatus which is similar to that of FIG. 3 except that an ultraviolet lamp is not illustrated, and bonded to each other at a reduced pressure, i.e., vacuum, of 1.0 Torr. The bonding of the substrates could be easily carried out by utilizing a mechanical chuck mechafor 30 seconds. The substrates were removed from the container to again inspect an appearance of the adhesive precursor layer with an optical microscope. No fine bubbles were observed.

As a final step, the two bonded circular substrates were again contained in the bonding apparatus, and the attached ultraviolet lamp was lighted to irradiate the adhesive precursor layer through the substrate with the ultraviolet radiation having a wavelength of 200 to 400 nm. Photopolymerization was caused, and Samples Nos. 1 to 13 of the optical disk in which the substrates were bonded with each other through the cured adhesive layer were thus obtained.

Each of the Samples Nos. 1 to 13 of the optical disk was set in a thickness measuring apparatus with an optical multifocus sensor produced by Quence Co. to determine a thickness of the adhesive layer in a non-destructive and non-contact manner according to predetermined measuring conditions. The results of the determination described in the following Table 2 were obtained. Note in the Table 2 that "average thickness (mm)" each is an average of the thickness of the adhesive layer of the two samples, and "dispersion of thickness (max.−min.)" is the difference (max.−min.) in the determination of the dispersion in the thickness of the adhesive layer with regard to an overall of the disk (an average value) and six tracks having different radial diameters (Tr. 1 to Tr. 6). Further, for the reference, the "average thickness" and the "dispersion of thickness" of three commercially available optical disks of DVD-9 type, #1, #2 and #3, are described in the following Table 2. Note that the DVD-9 disks used herein each comprises a pair of polycarbonate substrates with nominal thickness of 0.6 mm each, bonded with UV-curable acrylic adhesive.

TABLE 2

| Sample No. | UA/HPA | coating speed (rpm) | coating time (sec) | Average Thickness (mm) | dispersion of thickness (max.–min.) | | | | | | |
|---|---|---|---|---|---|---|---|---|---|---|---|
| | | | | | overall | Tr. 1 | Tr. 2 | Tr. 3 | Tr. 4 | Tr. 5 | Tr. 6 |
| 1 | 50/50 | 3000 | 10 | 60.7 | 13.1 | 5.0 | 2.8 | 1.6 | 2.2 | 1.0 | 3.5 |
| 2 | 50/50 | 3000 | 5 | 92.8 | 13.7 | 6.5 | 5.7 | 5.3 | 3.7 | 5.0 | 1.3 |
| 3 | 50/50 | 4500 | 5 | 59.1 | 11.6 | 4.9 | 7.1 | 4.6 | 4.6 | 4.1 | 3.1 |
| 4 | 50/50 | 5000 | 5 | 52.9 | 9.4 | 5.3 | 6.6 | 2.9 | 3.5 | 6.2 | 5.4 |
| 5 | 50/50 | 5000 | 3 | 67.8 | 13.2 | 5.7 | 6.5 | 5.7 | 2.2 | 3.8 | 7.1 |
| 6 | 50/50 | 5000 | 5 | 50.1 | 9.8 | 3.8 | 5.1 | 4.7 | 3.7 | 2.8 | 4.0 |
| 7 | 40/60 | 3000 | 5 | 52.8 | 10.9 | 4.3 | 6.3 | 2.5 | 3.8 | 7.6 | 5.0 |
| 8 | 40/60 | 3000 | 3 | 68.1 | 12.9 | 2.9 | 6.0 | 4.3 | 4.9 | 4.7 | 7.5 |
| 9 | 40/60 | 4000 | 3 | 50.9 | 14.1 | 3.8 | 4.7 | 4.3 | 2.9 | 7.9 | 7.9 |
| 10 | 40/60 | 4000 | 3 | 50.4 | 12.6 | 7.5 | 4.4 | 8.5 | 6.3 | 5.3 | 9.7 |
| 11 | 40/60 | 5000 | 3 | 41.2 | 11.8 | 5.7 | 6.0 | 2.6 | 5.7 | 6.9 | 7.4 |
| 12 | 60/40 | 5000 | 5 | 93.1 | 11.0 | 5.3 | 5.7 | 4.3 | 3.4 | 6.0 | 4.1 |
| 13 | 60/40 | 5000 | 10 | 59.2 | 14.0 | 8.8 | 5.6 | 6.5 | 3.5 | 5.3 | 9.1 |
| commercially available DVD-9 #1 | | | | 51.2 | 23.8 | 6.3 | 7.9 | 11.3 | 13.1 | 23.5 | 3.1 |
| Commercially available DVD-9 #2 | | | | 52.3 | 23.8 | 6.2 | 11.6 | 7.4 | 9.4 | 11.5 | 4.6 |
| Commercially available DVD-9 #3 | | | | 56.2 | 18.8 | 5.9 | 4.0 | 4.1 | 12.3 | 4.4 | 5.9 |

Particularly, the DVD-9 optical disks would be required that for the overall of the disk, the dispersion in the thickness of the adhesive layer should be 20 mm or less, and, for each track, it should be 8.0 mm or less. Under this premise, comparing the Samples Nos. 1 to 13 with the commercially available optical disks in the above Table 2, it is appreciated that the optical disks of the present invention can exhibit a notably diminished dispersion of the thickness of the adhesive layer, contrary to the commercially available optical disks.

Example 8

The bonded optical disk was produced in accordance with the method similar to that of Example 7 with the proviso that for this example, as is described in the following Table 3, the adhesive precursor having a viscosity of 2000 cps was evenly spin-coated at a predetermined thickness on each single surface of a pair of two transparent circular substrates made of polycarbonate. For the spincoating, the coating speed was 4700 rpm, and the coating time was 5 seconds.

Immediately after completion of the bonding of the substrates, the substrates were removed from the bonding apparatus, and an appearance of the adhesive precursor layer thereof was visually inspected. No bubbles were observed, however, the subsequent inspection using an optical microscope evidenced that some fine bubbles having a diameter of several ten microns are distributed in the adhesive precursor layer.

After the two bonded circular substrates were pressurized with introduction of a compressed air, an appearance of the adhesive precursor layer was again inspected with the optical microscope. The fine bubbles observed before pressurization were not observed.

Further, the thickness of the adhesive layer in the resulting bonded optical disk was determined to obtain the results described in the following Table 3.

Example 9

The bonded optical disk was produced in accordance with the method similar to that of Example 7 with the exception that for this example, an UV-curable adhesive precursor was prepared by mixing 60 parts of urethane acrylate, available under the trade designation "UX-4101" manufactured by Nippon Kayaku Co., Ltd., 40 parts of isoboronyl acrylate and 1 part of "Darocur 1173" manufactured by Merck (Japan) as a photoinitiator. As is described in the following Table 3, the viscosity of the resulting adhesive precursor was 7600 cps. The adhesive precursor was evenly spin-coated at a predetermined thickness on each single surface of a pair of two transparent circular substrates made of polycarbonate. For the spincoating, the coating speed was 4500 rpm, and the coating time was 7 seconds.

Immediately after completion of the bonding of the substrates, the substrates were removed from the bonding apparatus, and an appearance of the adhesive precursor layer thereof was visually inspected. No bubbles were observed, however, the subsequent inspection using an optical microscope evidenced that some fine bubbles having a diameter of several ten microns are distributed in the adhesive precursor layer.

After the two bonded circular substrates were pressurized with introduction of a compressed air, an appearance of the adhesive precursor layer was again inspected with the optical microscope. The fine bubbles were not observed.

Further, the thickness of the adhesive layer in the resulting bonded optical disk was determined to obtain the results described in the following Table 3.

Comparative Example 2

The bonded optical disk was produced in accordance with the method similar to that of Example 7 with the exception that for this example, for the comparison purpose, an UV-curable adhesive precursor was prepared by mixing 60 parts of ethylene oxide-modified bisphenol A diacrylate, available under the trade designation "R-551" manufactured by Nippon Kayaku Co., Ltd., 40 parts of phenoxyethyl acrylate and 1 part of "Darocur 1173" manufactured by Merck (Japan) as a photoinitiator. As is described in the following Table 3, the viscosity of the resulting adhesive precursor was 150 cps. The adhesive precursor was evenly spin-coated at a predetermined thickness on each single surface of a pair of two transparent circular substrates made of polycarbonate. For the spincoating, the coating speed was 3000 rpm, and the coating time was 3 seconds.

The thickness of the adhesive layer in the resulting bonded optical disk was determined to obtain the results described in the following Table 3.

Comparative Example 3

The bonded optical disk was produced in accordance with the method similar to that of Example 7 with the exception that for this example, for the comparison purpose, an UV-curable adhesive precursor was prepared by mixing 50 parts of urethane acrylate, available under the trade designation "UX-4101" manufactured by Nippon Kayaku Co., Ltd., 50 parts of ethylene oxide-modified bisphenol A diacrylate, "R-551" manufactured by Nippon Kayaku Co., Ltd., and 1 part of "Darocur 1173" manufactured by Merck (Japan) as a photoinitiator. As is described in the following Table 3, the viscosity of the resulting adhesive precursor was 43000 cps. The adhesive precursor was evenly spin-coated at a predetermined thickness on each single surface of a pair of two transparent circular substrates made of polycarbonate. For the spincoating, the coating speed was 5000 rpm, and the coating time was 10 seconds.

The thickness of the adhesive layer in the resulting bonded optical disk was determined to obtain the results described in the following Table 3.

TABLE 3

| Example No. | viscosity (cps) | Coating Speed (rpm) | Coating Time (sec) | average thickness (□m) | dispersion of thickness (max.–min.) | | | | | | |
|---|---|---|---|---|---|---|---|---|---|---|---|
| | | | | | overall | Tr. 1 | Tr. 2 | Tr. 3 | Tr. 4 | Tr. 5 | Tr. 6 |
| Ex. 8 | 2000 | 4700 | 5 | 53.2 | 9.4 | 1.9 | 3.7 | 2.4 | 3.7 | 2.1 | 4.1 |
| Ex. 9 | 7600 | 4500 | 7 | 94.7 | 18.4 | 1.2 | 2.1 | 1.3 | 1.2 | 1.6 | 6.2 |
| Comp. Ex. 2 | 150 | 3000 | 3 | 22.3 | 12.9 | 3.8 | 3.2 | 3.5 | 3.5 | 4.1 | 8.2 |
| Comp. Ex. 3 | 43000 | 5000 | 10 | 141.4 | 24.0 | 3.1 | 2.6 | 2.1 | 2.9 | 2.2 | 4.6 |

It is appreciated from the results of the above Table 3 that the optical disks of the present invention can exhibit a notably diminished dispersion of the thickness of the adhesive layer, contrary to the optical disks of Comparative Examples 2 and 3.

As described above, the present invention can provide a bonded optical disk which is easily producible and has excellent quality. In particular, in the bonded optical disk of the present invention, since a pressure sensitive adhesive precursor having a viscosity in a specific range is used in the formation of a pressure sensitive adhesive layer, good coatability is provided, inclusion of bubbles can be avoided, and the pressure sensitive adhesive precursor can be evenly coated on an irregular patterned substrate. Also, according to another embodiment of the present invention, since a liquid adhesive precursor having a viscosity as described above is used in the formation of the adhesive layer, the high quality bonded optical disks having an even coating thickness and no bubbles including fine bubbles incorporated can be provided. Further, according to the method of the present invention, the bonded optical disk of the present invention can be easily produced through a simple process, and inclusion of bubbles in a pressure sensitive adhesive layer interposed between the substrates can be avoided. In particular, the production of the above optical disk can be efficiently carried out using the production apparatus of the present invention, particularly an apparatus for bonding substrates.

What is claimed is:

1. A bonded optical disk comprising:
a first transparent substrate,
a second transparent substrate;
a light-permeable, pressure sensitive adhesive layer for bonding the first substrate to the second substrate; and
at least one information recording layer provided between the first substrate and the second substrate and the pressure sensitive adhesive layer,
wherein the pressure sensitive adhesive layer has been formed from a pressure sensitive adhesive precursor, having a viscosity of 10 to 5000 cps and being applied onto at least one of the first substrate and the second substrate, by radiation curing and has a gel fraction of not less than 50% and a storage modulus of $1.0 \times 10^4$ to $1.0 \times 10^7$ dyn/cm$^2$ at 25° C.

2. A bonded optical disk comprising:
a first transparent substrate;
a second transparent substrate;
a light-permeable adhesive layer for bonding the first substrate to the second substrate; and
at least one information recording layer provided between the first substrate and the second substrate and the adhesive layer,
wherein the adhesive layer is formed from a radiation-curable adhesive precursor comprising an acrylic compound selected from the group consisting of isooctyl acrylate, 2-ethylhexyl carbitol acrylate, n-butyl acrylate, isostearyl acrylate, urethane acrylate, and combinations thereof having a viscosity of 500 to 10000 cps which is irradiated to cause curing of the adhesive precursor, and wherein the first substrate and the second substrate are attached through the adhesive precursor, and wherein
the adhesive precursor, prior to being irradiated, is subjected to a pressure higher than an atmospheric pressure between the first substrate and the second substrate.

3. A method for producing a bonded optical disk comprising: a first transparent substrate; a second transparent substrate; a light-permeable, pressure sensitive adhesive layer for bonding the first substrate to the second substrate; and at least one information recording layer provided between the first substrate and the second substrate and the pressure sensitive adhesive layer, said method comprising the steps of:
applying a pressure sensitive adhesive precursor having a viscosity of 10 to 5000 cps on at least one surface of the first substrate and the second substrate;
applying radiation directly to the pressure sensitive adhesive precursor to form a pressure sensitive adhesive layer which has been brought to a gel fraction of not less than 50% and a storage modulus of $1.0 \times 10^4$ to $1.0 \times 10^7$ dyn/cm$^2$ at 25° C.; and
bonding the first substrate to the second substrate through the pressure sensitive adhesive layer under reduced pressure.

4. A method for producing a bonded optical disk comprising: a first transparent substrate; a second transparent substrate; a light-permeable, adhesive layer for bonding the first substrate to the second substrate; and at least one information recording layer provided between the first substrate and the second substrate and the adhesive layer, said method comprising the steps of:

applying a radiation-curable adhesive precursor comprising an acrylic compound selected from the group consisting of isooctyl acrylate, 2-ethylhexyl carbitol acrylate, n-butyl acrylate, isostearyl acrylate, urethane acrylate, and combinations thereof having a viscosity of 500 to 10000 cps on at least one surface of the first substrate and the second substrate;

combining the first substrate and the second substrate, with the adhesive precursor between the first and second substrates, under a reduced pressure;

exposing the adhesive precursor to a pressure higher than an atmospheric pressure, while maintaining the combined state of the first substrate, the second substrate and the adhesive precursor; and irradiating the adhesive precursor with radiation to cause its curing, thereby bonding the first substrate and the second substrate through the adhesive layer.

5. An apparatus for producing a bonded optical disk comprising: first and second transparent substrates each having an opening in its center portion; a light-permeable adhesive layer for bonding the first substrate to the second substrate; and at least one information recording layer provided between the first substrate and the second substrate and the adhesive layer, said apparatus comprising:

(1) a vacuum chamber for housing therein the first substrate and the second substrate, the vacuum chamber being capable of being evacuated to a predetermined pressure;

(2) a first shaft having an end section, within the vacuum chamber, for supporting one of the first and second substrates in the circumferential portion of the opening; and (3) a second shaft having an end section, within the vacuum chamber, for supporting the other substrate in the circumferential portion of the opening, the front end of the end section in the first shaft and the front end of the end section in the second shaft being disposed within the opening of the first substrate and the opening of the second substrate, at least one of the first and second shafts being movable so that the end section of the first shaft and the end section of the second shaft disposed so as to face each other are allowed to mate to each other to bring the first and second substrates into intimate contact with each other.

6. An apparatus for producing a bonded optical disk according to claim 5, in which said adhesive layer is a pressure sensitive adhesive layer.

7. An apparatus for producing a bonded optical disk according to claim 5 or 6, in which said vacuum chamber further comprises, having connected therewith, a pressurizing apparatus for exposing the adhesive precursor to a pressure higher than an atmospheric pressure, while maintaining the combined state of the first substrate, the second substrate and the adhesive precursor.

* * * * *